(12) United States Patent
Pellegrino et al.

(10) Patent No.: US 7,536,331 B1
(45) Date of Patent: May 19, 2009

(54) METHOD FOR DETERMINING THE RISK ASSOCIATED WITH LICENSING OR ENFORCING INTELLECTUAL PROPERTY

(75) Inventors: Frank J. Pellegrino, Westport, CT (US); Robert W. Fletcher, 10503 Timberwood Cir., Suite 220, Louisville, KY (US) 40223

(73) Assignee: Robert W. Fletcher, Louisville, KY (US)

( * ) Notice: Subject to any disclaimer, the term of this patent is extended or adjusted under 35 U.S.C. 154(b) by 1149 days.

(21) Appl. No.: 08/581,992

(22) Filed: Jan. 2, 1996

(51) Int. Cl.
*G06Q 40/00* (2006.01)
(52) U.S. Cl. ..................... 705/36 R; 705/35
(58) Field of Classification Search ............. 705/1, 705/4, 10, 36 R, 35; 380/4, 52
See application file for complete search history.

(56) References Cited

U.S. PATENT DOCUMENTS

| | | | | |
|---|---|---|---|---|
| 4,975,840 A | * | 12/1990 | DeTore et al. ............... | 364/401 |
| 5,526,257 A | * | 6/1996 | Lerner ....................... | 364/401 |
| 5,533,123 A | * | 7/1996 | Force et al. ................. | 380/4 |
| 5,680,305 A | * | 10/1997 | Apgar, IV ................... | 364/401 |
| 5,692,501 A | * | 12/1997 | Minturn et al. ............. | 128/630 |
| 5,999,907 A | * | 12/1999 | Donner ....................... | 705/1 |

OTHER PUBLICATIONS

Robinson, W.J. "Insurance coverage of intellectual property lawsuits in the computer industry". International computer law adviser. vol. 6, No. 3-4, p. 21-42.*
Sullvian, Deidre "American Banker". vol. 159, No. 108, p. 17(1).*
Harbert, Tammi Patent Enforcement Policy Aids Technology Transfer. Technology Access Report.*

* cited by examiner

*Primary Examiner*—Hani M. Kazimi

(57) ABSTRACT

The invention is a method of determining the risk associated with licensing and/or enforcing intellectual property by interacting with a pre-programmed computer, entering information from an assessment form and task sheet submitted by the Intellectual Property owner and from other sources, evaluating the information by comparing it to pre-set standards, computing a composite score which represents the risk associated with commercializing such intellectual property, and using that score to determine the desirability of undertaking the commercialization of Intellectual Property by multiplying the total cost of attempted licensing and/or enforcement lawsuits by the composite score to arrive at a final cash requirement which is compared to a target recovery.

18 Claims, 1 Drawing Sheet

METHOD FOR DETERMINING THE RISK ASSOCIATED WITH LICENSING OR ENFORCING INTELLECTUAL PROPERTY

CROSS REFERENCE TO RELATED APPLICATIONS

This application is a continuation in part of co-pending application Ser. No. 08/546,120, filed on Oct. 20, 1995.

BACKGROUND OF THE INVENTION

As the universal body of knowledge grows, intellectual property becomes more and more an important part of society and its owners realize the benefits of commercializing it through licensing or litigation. Even though accountants have long been perplexed by inability to fix a sum-certain value for intellectual property, that fact does not detract from its importance as an income producing asset. In fact, it has been reported that 25% of the exports of the United States are in the form of intellectual property. Frequently, this intellectual property takes the form of patents, copyrights, trademarks and associated know-how.

As is typically the case, when any class of assets becomes significant to the holder and to the economy in general, the financial community will respond. In the case of intellectual property, not only has the financial community responded with venture capital financing for start-ups, initial public offerings and consortiums formed to promote the products of the intellectual property but, now the financial community is providing contributors of funds for the enforcement of intellectual property rights.

Those skilled in intellectual property matters recognize that patents, copyrights and trademarks are created by national and state laws and, in fact, all confer upon the owner a negative right. This negative right is in the form of the power to exclude others from making, using, selling, offering for sale or otherwise using the works, mark, process, machine, manufacture or composition of matter defined by the respective copyright, trademark or patent(s). It is, however, well recognized that intellectual property enforcement lawsuits are among the most expensive forms of litigation in the United States. Frequently, then, the value of the intellectual property asset is measured by the owners ability to enforce the rights conferred thereby. Consequently, large corporations such as Honeywell Inc. and Texas Instruments have been recognized to have valuable intellectual property assets principally because of their success in enforcing those assets against competitors.

It is not surprising, therefore, that more than 50% of the patent lawsuits in the United States are brought by large well financed organizations which can more easily afford the cost. That is not to say that large organizations are free to bring intellectual property infringement suits in unbridled fashion, for there first must be an infringer to sue, and second, even these organizations are subject to budgetary constraints with patent infringement suits being assigned a relative priority vis-a-vis other uses of corporate capital.

By way of illustration, in 1991, there existed approximately 1.3 million unexpired U.S. patents. Those patents were held by approximately 109,000 corporations and 225,000 individuals. Of those entities, fewer than 4,000 of the largest corporations holding 100 or more unexpired patents accounted for more than 50% of the lawsuits, while the individuals and approximately 80,000 companies owning three or fewer patents (305,000 entities in total) accounted for only about 75% of the balance. Interestingly, large corporations, measured by both revenue and number of patents held, made up more than 50% of the total number of defendants. (There is, of course, generally a direct relationship between the number of patents held and the revenues generated by a corporation.)

Thus, in the overall picture it is the individuals and small companies who are without the means to enforce their patents and consequently, without the means to develop their patents' full potential. A significant need thus exists for a financial capability to commercialize and especially to license and/or enforce intellectual property. This financial capability must be offered expeditiously, efficiently and at low cost. It is against this background that the present invention is most easily understood.

SUMMARY OF THE INVENTION

The invention is a process or method for evaluating the strength of a specific intellectual property for the purposes of commercializing it. The term commercialize may include manufacturing, using or selling the subject matter defined by the intellectual property for profit but, in the context of the present invention, also means the licensing and bringing suit to enforce the intellectual property. The inventive method comprises the steps of interacting with a computer, which is generally pre-programmed, by entering data from a questionnaire completed by the owner of the intellectual property or on his behalf as well as data, the results of a series of completed tasks, and from other sources into the computer memory. The memory is programmed such that the data is organized by predetermined risk factors. The data is then evaluated by comparing it to a preset standard for that risk factor and computing a score which represents a relative degree of strength associated with any intellectual property. The risk factors are preferably grouped into categories. A category score is also computed which represents a degree of riskiness for the risk category being evaluated. The category score, which may be a weighted score, is then used to determine the strength of the intellectual property for purposes of commercializing it.

It is possible to carry out the method of entering data into the computer memory via telephone from a location other than the location of the computer. In one embodiment, predetermined risk factors are organized into the risk categories of product data, manufacturing data, patent strength, patented commodity, patent/business relationship, general background, competitive environment, litigation history, insurance history and economic climate.

In another embodiment of the invention, the risk factors are not grouped into risk categories, but each risk factor is given its own weight vis-a-vis the totality of all risk factors being considered.

Although specific reference will be made from time to time to patents, it will be noted by those skilled in intellectual property matters, that many of the factors and considerations discussed apply to copyrights and trademarks. Thus, when the term patent(s) is used, it should be understood that it may encompass all other forms of intellectual property rights as well.

After having determined the risk factors and risk categories, it is further contemplated a standard, a mean or an average be calculated vis-a-vis data in each risk factor database or risk factor category. Then the significance of the specific risk factor or category in question can be expressed in terms of relative risk i.e., relative to the mean, standard or average of data in that risk factor or category. Another feature of the invention is that the weighting of risk factors and risk categories is contemplated. Generally, the weight given to each is derived from estimates or actual experience gained through a test marketing program.

It is contemplated that risk factors weighted or unweighted can be categorized and a category score can be calculated. The category scores can then be tallied, weighted or unweighted into a composite score. This composite score can then be used to evaluate the strength of a specific intellectual property.

The present invention includes, in one embodiment, the selection of an important risk factor such as the information relating to the outcome of lawsuits in a given country as a primary risk indicia. Using that country's patent classification system a standard can be calculated, such primary risk indicia can then be a starting point to which risk factor or risk category information can be applied to calculate a composite score. Information derived from practical experience vis-a-vis recovered dollar amounts can then be applied to calculate a base recovery. The base recovery is typically increased by recovered costs and interest factors and reduced by litigation costs to arrive at a final profit.

The process of determining the standard for certain of the risk factors, according to the present invention, can be accomplished by applying actual experience factors to calculate the standard. This standard may be for example, a ratio derived from the number and/or outcome of the patent lawsuits brought in a certain circuit, compared to the average number of patent lawsuits brought in all circuits. Compiling this experience data enables one to establish a norm or an average for all circuits in general. Then an individual patent risk factor, i.e. circuit of residence of possible infringers, is compared to this average and a relative risk factor is obtained.

Upon enforcing sufficient numbers of patents, it becomes possible to determine the degree of adverse selection which applies to such patents. This degree of adverse selection is sometimes referred to as the moral hazard. Simply stated, the moral hazard takes into account the fact that an intellectual property owner will have a greater propensity to enforce the given item of intellectual property under which he will receive the maximum return perhaps even at the expense of enforcing a stronger intellectual property. Experience in enforcement of intellectual property will allow adjustment of the relative risk factor, category score or composite score to account for this moral hazard. This adjustment leads to an adjusted or probable success factor which is important in assessing the risk of loss in any commercialization activity.

The composite score can be based upon any one of several different indicia as the primary risk indicia. One primary risk indicia is litigation success according to patent classification. However, other indicia such as the size of the intellectual property owner or potential defendant measured by, for an example, annual revenues, can also serve as a primary risk indicia.

Another primary risk indicia can be the age of the intellectual property. Not surprisingly, older intellectual property has a lower likelihood of being infringed and thus, enforced. In fact, the likelihood of a patent being the subject of a successful lawsuit is inversely proportional to its age. Using age of intellectual property as a primary risk indicia permits the calculation of a composite score which then can be adjusted for moral hazard or adjusted by some other known or ascertainable indicia to arrive at a probable success factor.

Also a preferred primary risk indicia is an infringement study and letter opining that the U.S. patents to be commercialized are infringed by the product sought to be licensed.

As another example, it may be desirable to use two weighted indicia as the primary risk indicia. It may be possible to obtain information concerning the success of enforcing a patent in a given patent classification and the frequency of success based upon the age of the patent within the classification. It is also possible to use multiple indicia of the same or varying weights to establish a primary risk indicia for purposes of the present invention. Although it is preferable that actual experience permitting moral hazard adjustment would be used, it is not essential for purposes of the present invention to adjust the composite score based upon moral hazard of enforcing any given intellectual property.

The present invention is the method of computing the risk of commercializing intellectual property by pre-programming a computer such that by inputting selected data, the relative risk and probable success factors are calculated automatically. It is an objective of the present invention then, to reduce the role of a skilled patent practitioner or perhaps eliminate altogether, the involvement of such patent practitioner in determining the risk of commercializing any given intellectual property.

With respect to the relative risk factors, it comes to mind that many considerations can enter into the risk involved in determining the enforceability and licenseability of any given intellectual property. As has been suggested previously, information concerning the product may be highly relevant, for example, perhaps the product uses scarce raw materials. One would conclude that scarce raw materials would be an impediment to large volume production and larger royalties. Similarly, the need for highly skilled labor would reduce the potential for large royalties and again be a consideration in determining the relative risk. Also, considerations such as any resultant toxic or pollutant materials as a by-product may be again, a deterrent to going into production and therefore, lessen the chances of a large monetary gain.

The present invention contemplates the use of one or more of the risk factors set forth below, any one of which could also be a primary risk indicia under appropriate circumstances:

1. Number of existing commercial embodiments.
2. Number of contemplated embodiments.
3. Attractiveness of design.
4. Efficient function/performance.
5. Available in variety of sizes and weights.
6. Attractive packaging.
7. Attractive pricing.
8. Attractive profit.
9. Multiple uses/end uses.
10. Meets existing need in accessible market sector.
11. Amount of capital investment required.
12. Whether sophisticated specialty processing/manufacturing equipment is required.
13. Whether unique, proprietary (not readily available) raw materials are required.
14. Skilled labor requirements.
15. Special power, fuel, energy, water or environmental requirements.
16. Present/contemplated production volume.
17. Level of manufacturing cost.
18. Know-how and/or trade secrets available or in use.
19. Labor problems, toxic wastes, hazardous conditions.
20. SIC code, nature of industry, e.g., mature, stable or new.
21. Prima facie validity of patent (Has patent been involved in interference? Post grant procedure? Declaratory judgement?
22. Official Patent Office Classification.
23. Class of patent (pioneer; generic, regular, improvement).
24. In crowded prior art.
25. Perceived quality of disclosure.

26. Perceived quality/specificity and number of claims.
27. Offensive patent (Covers own product or viable alternatives).
28. Defensive patent (Obtained to ensure patentee's operating freedom).
29. Dominated by pioneering/generic patent(s).
30. Age of patent.
31. Nature and field of commodity (mechanical; chemical; intermediate; pharmaceutical; etc.)
32. Sector of market where patented commodity is in use or useful.
33. Outstanding patented feature.
34. Does Intellectual Property owner's own product/commodity meet "infringement test"? Any difficulties in proving infringement?
35. Are patent markings applied to goods? Are goods trademarked?
36. How many independent/dependent claims cover Intellectual Property owner's commercial embodiment(s)?
37. Any additional products/processes/uses covered by claims?
38. Any shop rights permitting others use of any of the inventions?
39. Has Intellectual Property owner designed around a third party patent?
40. Expected life of patented commodity?
41. How are patents related to business of Intellectual Property owner?
42. Is patent insured?
43. Does Intellectual Property owner operate under an umbrella of a sizable portfolio of intellectual property rights (Patents; designs, know-how; trademarks)?
44. Are the patents the result of in-house work; R&D?
45. In-house patent/legal counsel available with understanding of patent's relationship to products of owner and competitors?
46. What is status of foreign protection vis-a-vis foreign markets/competition?
47. Does Intellectual Property owner have a history of licensing patent(s) to competitors as exemplified by active licensing program?
48. Has, or will, Intellectual Property owner license other patents?
49. Will inventor(s) be available and "friendly" witnesses? For example, does owner have good title to patent from inventor.
50. Is patented subject matter also subject of a trademark?
51. Type of business.
52. Legal Status.
53. Ownership/Control of business.
54. Sponsored by Small Business Administration.
55. Size of business.
56. Rate of growth during past five years.
57. Financial strength and profitability.
58. Integrity and reputation.
59. Recognized leader in the field.
60. Known for strong management.
61. Does owner occupy a dominant position in the manufacture or marketing in the business sectors of the patents?
62. Does owner have notice, or is he aware of infringing activities in the USA or elsewhere?
63. Is there a significant degree of "migration" of personnel in this sector of industry?
64. Are there any alternative commodities outside the scope of owner's inventions filling essentially the same need?
65. What is the competitive situation in the area of business of the patented commodities?
66. Which sector of the market, industrial/manufacturing/retail has the largest demand for owner's goods?
67. By whom and how is the demand met?
68. Are price or quality of goods essential in meeting demand?
69. What type/size sales/distribution systems are utilized by owner?
70. Is copying of competitor's products frequent in the given sector of industry?
71. Has owner received any notices of infringement on subject matter claimed by patents to be enforced?
72. Has owner sent any notices of infringement on subject matter claimed by patents to be enforced?
73. Has owner any history of past or present involvement in litigation?
74. Has owner demonstrated "appetite" for litigation or alternatives?
75. What is owner's attitude toward settlement?
76. Does owner take aggressive stance in negotiations with labor, etc.?
77. Is management known for litigous attitudes as Plaintiff (e.g., among its peers or in its industry)?
78. Has owner been involved in FTC or Department Justice, antitrust or similar proceedings?
79. Has owner been involved in enforcement or employee secrecy agreements?
80. Owner's attitude toward arbitration.
81. Did Enforcer solicit owner (or vice versa) to obtain litigation commercialization support?
82. Does owner seek insurance to reduce potential financial exposure?
83. Does owner expect to litigate or does he believe licensing is possible?
84. Does owner seek litigation expense insurance to have as a comfort factor or to meet a contractual commitment, such as?
85. License.
86. Hold harmless.
87. Does owner tend to over-insure?
88. Any favorable/unfavorable information on fire, casualty, credit or other insurance loss experience?
89. Any reason to suspect abuse of litigation expense budget?
90. Any demonstrable attitude indicating "appetite" for litigation?
91. Potential sales/profit losses from unabated infringement?
92. Marketshare owner presently has and expects?
93. Ratio of sales of product covered by patent to total product sales.
94. Cash flow situation (Ratio Analysis)
95. Life cycle of products of their business (as indicated by capital expenditures as a % of sales).
96. R&D expenses as a percentage of the total.
97. Change in marketshare of competitors due to improved/alternative technology.
98. Change in marketshare that is an increase for competitors.
99. Profitability of products.
100. Where are we in this economic cycle and trend of industry?

It should be noted that the first ten risk factors can be categorized into the risk category, Product Data. Similarly, the second ten can be categorized into Manufacturing Data. The third ten risk factors can be categorized into Patent Strength. The fourth ten risk factors can be categorized into the risk category, Patented Commodity. Similarly, the fifth ten can be categorized into Patent/Business Relationship. The sixth ten risk factors can be categorized into General Background. The seventh ten risk factors can be categorized into Competitive Environment. The eighth ten risk factors can be categorized into Litigation History. The ninth set of ten risk factors can be categorized into Insurance History and the last ten risk factors can be categorized into Economic Climate. It should be noted, however, that the various risk factors may not necessarily all be used, nor must they be categorized into the suggested risk categories.

The above list of subjects is not intended to be exhaustive and may be changed or modified, condensed, combined or otherwise differentiated by those skilled in the art and in such forms pre-programmed, weighted and installed on a computer for purposes of evaluating the risk of commercializing a given product or intellectual property.

It should be understood that for purposes of this invention, it is not necessary to first determine a relative risk factor and then adjust that risk factor to calculate a total risk factor against which determined claims recoveries are juxtaposed to calculate net recovery, rather single considerations taking into account age of patent, classification, subject matter or any other(s) in the above list may be programmed into a computer, each being weighted relative to the other to determine a risk factor which is then used to derive net recovery.

DETAILED DESCRIPTION OF THE DRAWINGS

Figure 1:
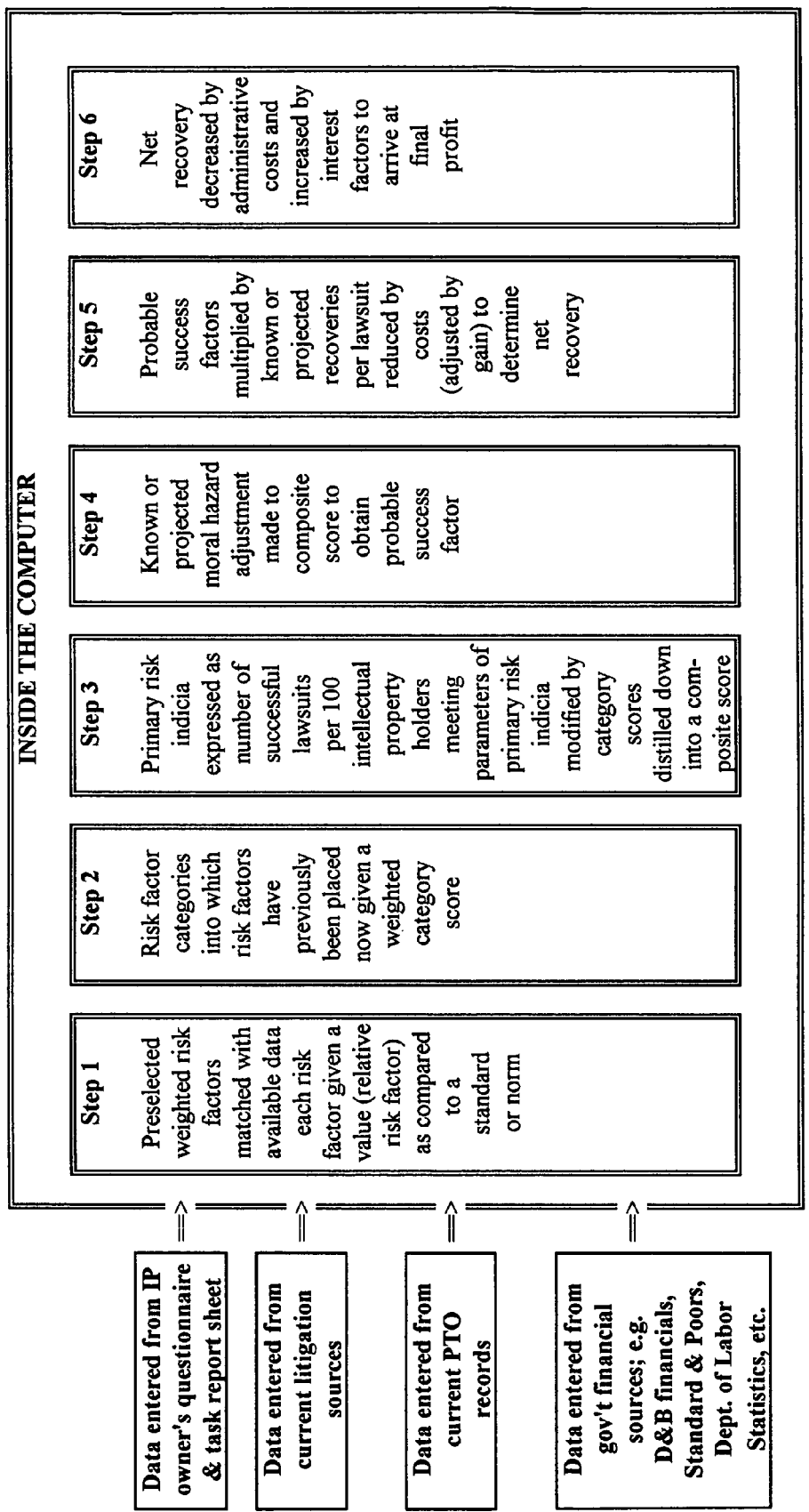
FIG. 1 is a block diagram showing the steps of the preferred method of the present invention.

FIG. 1 shows the interaction with a pre-programmed computer wherein data is entered from an Intellectual Property owner's questionnaire, a task report sheet, current litigation sources, current PTO records and from government and financial sources. Such sources can be, for an example, Dunn & Bradstreet financial reports, Standard & Poors reports, Department of Labor statistics and the like. Shown is the entering of data into the computer memory, the memory having been programmed with steps 1 through 6. The data is organized by pre-determined risk factors. Generally the risk factors have been included in the computer memory and the data is matched therewith to establish the risk factors which are then considered. Each of the risk factors which has been pre-programmed into the computer carries with it a standard or norm. Thus, when the data is matched with a risk factor, it is compared to this preset standard or norm to yield a relative risk factor. The pre-programmed, pre-selected risk factors are weighted with some being deemed more important and thus given more weight than others.

Preferably, the pre-programmed risk factors have previously been categorized into risk categories and depending upon how many risk factors have been ascertained for the specific patent or product in question, each category is given a weighted value which results in a weighted category score. It should be noted that if categorization is not included as a step in the evaluation of risk, then the score is a relative risk factor score derived from all risk factors considered.

Step 3 involves the use of a primary risk indicia, in this case expressed as the number of successful lawsuits per one hundred intellectual property holders meeting the parameters of the primary risk indicia, which is modified by the risk factor score or category score resulting in a composite score. At this stage, the risk has now been determined. It is possible however, to add a fourth step which adjusts the composite score by a known or projected moral hazard adjustment to arrive at a probable success factor.

As is shown in step 5, it is possible to take the probable success factor of step 4 and multiply it by a known or projected recovery per lawsuit preferably reduced by costs (adjusted by gain), to determine a net recovery. Lastly, step 6 may be included wherein the net recovery is decreased by administrative costs and increased by interest factors to arrive at a final profit.

DESCRIPTION OF THE BEST MODE AND PREFERRED EMBODIMENT

The preferred embodiment involves the use of a computer which is programmed in such a fashion that a determination of the risk associated with commercializing intellectual property can be made. Preferably, the intellectual property is patents, but copyrights and trademarks may be dealt with in the same manner. Typically, patent holders are desirous of acquiring investors which will assist them in the enforcement of their patents against accused infringers. Correspondingly, investors are desirous of having a fast, efficient, low cost method which will enable them to evaluate the risk associated with commercializing such patents. There are a multiplicity of risk factors recited heretofore which could be taken into consideration in making such an evaluation. It should be noted that not all the risk factors may be used in an evaluation. The invention contemplates at least one risk factor being used however. These risk factors may typically be more broadly categorized into risk categories. And finally, those categories can be even more broadly grouped into reasons for or against enforcement of a patent and labeled enforcement motivators and deterrents.

Among enforcement or commercialization motivators, we find such considerations as the profit others would make from producing an infringing article and the ease of entry into production and/or into the marketplace. If enforcement is undertaken for the purpose of licensing the patents to infringers then among enforcement motivators we find the strength of the patent (which involves the validity and scope of the claims) and the patent holders ability to act, i.e., size of the company, financial strength, number of technical and support personnel, assertiveness of the management and the like. Also the patent holders likely performance as a witness or as a deponent is important. Any of the latter risk factors can be either an enforcement motivator or an enforcement deterrent based upon the subject matter the risk factor addresses.

It is, of course, important to gain experience by actually enforcing patents and carefully recording the results in a test market case so that proper weight can be accorded to each risk factor. Initially, of course, it is important to estimate the weight which should be given to each risk factor, but as experience is gained, the risk factor weight may be adjusted. It is also preferred that each risk category be assigned an initial weight as compared to its importance vis-a-vis other risk categories. It may later be advisable to adjust the weight given to each risk category after initial test marketing to achieve the best possible enforcement risk analysis.

It should be noted, as it was noted earlier, that the step of grouping risk factors into risk categories is not essential for the practice of the present invention. It is possible to merely set forth one or more relevant risk factors and make a determination as to enforcement riskiness by determining the importance of each risk factor without ever having combined the risk factors into risk categories or labeling them as enforcement motivators and deterrents. It is however, felt that the use of risk factors and risk categories is a more refined method of making the enforcement risk analysis.

In the most preferred embodiment, a primary risk indicia is selected. One example of a primary risk indicia is the outcome of current cases segregated by the class into which the U.S. Patent Office classifies the enforced patent. Thus, the primary risk indicia would be the class and/or subclass of the patent to be enforced. The computer program of the present invention, with its weighted consideration of risk factors and risk categories, then serves to allow the calculation of a enforcement risk factor or a weighted category score to modify this primary indicia reflecting the circumstances of the particular patent to be enforced. Thus, the primary risk indicia, which may be for an example, the fact that one out of every twenty (0.05) patents enforced in Class XYZ results in a recovery greater than $500,000, can be modified by the degree of infringement (number of items being produced) of an individual patent in Class XYZ sought to be enforced. Thus, if the normal reward of an enforced patent in Class XYZ is five hundred thousand dollars, application of the weighting factors from the computer program of this invention may change that reward so that, for instance, in the case of our hypothetical patent in Class XYZ to be enforced, the adjusted reward may be, for example, one million dollars. This would suggest that the Class XYZ patent being considered is more rewarding and thus, a better candidate for enforcement than the normal or average patent in Class XYZ. The net recovery would be so modified to reflect this increase in return and consequent reduction in risk.

Other primary risk indicia would also occur to those skilled in the art and could be substituted for the example of patent class in determining the risk of enforcing a given patent. Also it should be noted that whichever primary risk indicia is selected, generally the others not selected become simply risk factors considered along with other risk factors in calculating the relative risk of enforcing a given patent.

In the preferred embodiment of the present invention, information reported from the performance of certain tasks is very helpful in evaluating the strength of a specific intellectual property for purposes of commercializing it. The following is a list of tasks and subtasks performed and when reported into the computer allow for a preferred evaluation and therefore a preferred commercialization analysis.

Task 1 a) Technical Orientation
Review owners relevant information regarding patents/technology b) Technical Review
Review patent claims
Analyze test results relative to market
Technical data study
Performance comparisons of competitor c) Preliminary Assessment
Summary analysis Task 2 a) Patent Study
Study patent file history
Conduct validity study
Investigate bars to enforcement Task 3 a) Market Identification and Analysis
Identify Markets
Analyze damages/prioritize markets
Identify license candidates b) Industry Intelligence
Evaluation interviews with industry experts
Refine and confirm c) Cost/Benefit Analysis
Evaluation of potential application (economics, costs, benefits, etc.)

d) Marketing/Licensing Assessment
Analysis of Market
Analysis of cost/benefit
Analysis of industry intelligence Task 4 a) Licensing/Enforcement
Prioritize Patents
Develop royalty structure
Develop model license agreements
Develop promotional materials
Develop infringement risk study
Prepare licensing presentation
Identify infringers
Classify infringers
Prepare infringement presentation
Anticipate defenses
Develop infringement arguments
Contact potential licensees/infringers
Negotiate licenses/cease & desist agreements After having read the foregoing disclosure, variations on the methodology employed in the present invention may occur to those skilled in the art. It is applicant's intent that the following claims directed to the invention will encompass these variations. Moreover, it is equally evident that the process described in detail herein may be applicable to the evaluation of risk of other types of lawsuits.

What is claimed is:

1. A process for evaluating the strength of a specific intellectual property for purposes of commercializing it comprising the steps of:
   a. interacting with a computer;
   b. entering data from one or more sources including from a complete set of pre-selected tasks and from a questionnaire; into said computer, said computer having been pre-programmed such that said data is organized by one or more predetermined risk factors grouped into categories consisting essentially of product data, manufacturing data, patent strength, patented commodity, patent/business relationship, general background, competitive environment, litigation history, insurance history and economic climate;
   c. evaluating, using a computer, the data by comparing each risk factor and each category to a preset standard;
   d. computing, using a computer, a score by transforming said data into a composite score which represents a relative degree of strength associated with any undertaking to commercialize said intellectual property.

2. The process of claim 1 wherein entering of the data into the computer is done via telephone from a location other than the location having the computer.

3. The process of claim 1 wherein the predetermined risk factors are grouped into categories selected from the categorized of subjects comprising: Technical Orientation, Technical Review, Preliminary Assessment, Patent Study, Market Identification, and Analysis, Industry Intelligence, Cost/Benefit Analysis, Marketing/Licensing Assessment and Licensing/Enforcement.

4. The process of claim 3 wherein transforming said data is achieved by calculating a category score for each category.

5. The process of claim 4 wherein each category score is weighted and combined with other category scores and used to modify a primary risk indicia to calculate said composite score.

6. The process of claim 5 wherein the composite score is modified by a moral hazard factor to calculate a probable success factor.

7. The process of claim 6 wherein the probable success factor is multiplied in a post-computer step by projected recoveries to determine the net recovery from commercializing the intellectual property.

8. The process of claim 7 wherein the intellectual property to be commercialized is a patent.

9. The process of claim 7 wherein the intellectual property to be commercialized is a trademark.

10. The process of claim 7 wherein the intellectual property to be commercialized is a copyright.

11. A process for determining the probable success of a lawsuit comprising the steps of:
   a. interacting with a pre-programmed computer;
   b. entering data from one or more sources including from a completed set of pre-selected tasks and from a questionnaire into said computer, said computer having been pre-programmed such that said data is organized by pre-determined categories consisting essentially of product data, manufacturing data, patent strength, patented commodity, patent/business relationship, general background, competitive environment, litigation history, insurance history and economic climate;
   c. evaluating, using a computer, the data by comparing each category to a preset standard;
   d. transforming, using a computer, said data into a composite score which represents a relative degree of strength associated with the lawsuit;
   e. using the composite score to determine a probable success factor for undertaking the lawsuit.

12. The process of claim 11 wherein the lawsuit is one involving intellectual property.

13. The process of claim 12 wherein the composite score is based upon an evaluation of one or more risk factors specific to the intellectual property upon which a suit is being brought.

14. The process of claim 12 wherein the composite score is a category score resulting from categorizing various risk factors into categories and determining a category score.

15. The process of claim 14 wherein the category score is used to modify a primary risk indicia in determining a composite score.

16. The process of claim 15 wherein an adjustment for moral hazard is made to the composite score resulting in a probable success factor.

17. The process of claim 16 wherein the probable success factor is applied in a post-computer step to a projected recovery to determine the net recovery.

18. The process of claim 14 wherein the determination of the category score is accomplished using at least one relative risk factor.

* * * * *